United States Patent [19]

Sides

[11] Patent Number: 5,048,831
[45] Date of Patent: Sep. 17, 1991

[54] ELECTRONIC GAME APPARATUS AND METHOD OF USE

[76] Inventor: Jim T. Sides, 218 Valhalla Rd., Cordele, Ga. 31015

[21] Appl. No.: 578,993

[22] Filed: Aug. 31, 1990

[51] Int. Cl.$^5$ .................................... A63F 9/22
[52] U.S. Cl. ............................ 273/85 G; 273/460
[58] Field of Search ............... 273/460, 85 CP, 85 G, 273/138 A

[56] References Cited

U.S. PATENT DOCUMENTS

| | | | |
|---|---|---|---|
| 2,994,531 | 8/1961 | Eberwein | 273/460 X |
| 3,149,841 | 9/1964 | Hullman | 273/460 X |
| 4,141,548 | 2/1979 | Everton | 273/460 |
| 4,322,073 | 3/1982 | Slavik et al. | 273/460 X |
| 4,391,444 | 7/1983 | Bromley | 273/94 |
| 4,572,509 | 2/1986 | Sitrick | 273/85 G |
| 4,592,546 | 6/1986 | Fascenda et al. | 273/460 X |
| 4,614,342 | 9/1986 | Takashima | 273/85 CP |
| 4,871,176 | 10/1989 | Knetzger | 273/460 X |

Primary Examiner—William H. Grieb
Attorney, Agent, or Firm—Ronald B. Sefrna

[57] ABSTRACT

The present invention provides a hand held electronic game apparatus useable by a single player, but also useable for direct competitive play between two or more players through both direct physical linkage of multiple units of the apparatus and indirect linkage by radio signals or the like. The apparatus includes a basic electronic game module, internal data storage memory for storing game scores or point totals, data storage media as a source of game programming and of electronic storage of game scores or points, a communication cable for direct linkage, and a signal transmitter/receiver for indirect linkage. The invention also provides a method of use of the apparatus for interactively initiating and playing an electronic game and for permanently recording final score or point totals at the conclusion of the game.

19 Claims, 2 Drawing Sheets

ELECTRONIC GAME APPARATUS AND METHOD OF USE

FIELD OF THE INVENTION

The present invention generally relates to game apparatus, and more specifically relates to hand held electronic game apparatus adapted for the creation of interactive communication links between two or more units of the apparatus for the competitive playing of electronic games between two or more users, and further adapted for the storage and transfer of game scores and/or point totals from a unit of the game apparatus to a discrete unit of electronic/magnetic storage media.

BACKGROUND OF THE INVENTION

Video games or electronic games have become extremely popular in recent years, and the technology for such games has progressed from the original arcade-type game apparatus to home-type game apparatus which is typically connected to a TV receiver, and more recently, to hand held portable game apparatus. Arcade-type and home-type game apparatus allow two or more players to compete with each other so long as they use the same game apparatus, and the recently introduced hand held apparatus typically is useable by only a single player. Even the arcade-type and home-type game apparatus do not provide the capability of interactive play by individuals at locations remote from each other.

Some efforts to link game apparatus are known in the prior art. For example, Bromley U.S. Pat. No. 4,391,444 discloses an electronic football game with a central simulated playing field and two control panels which may be simultaneously and interactively used by two players. However, the approach illustrated by the Bromley patent continues to suffer disadvantages, in that the game apparatus is dedicated to a single game, and the control panels, while separate from each other, are physically linked within the same apparatus structure.

Another approach is illustrated by Takashima U.S. Pat. No. 4,614,342, which discloses a central "dealer unit" and a plurality of individual player units responsive to the central dealer unit. The overall apparatus used in the general approach illustrated by Takashima is not limited to a single game, and may be utilized by a plurality of players interacting with the single dealer unit, but does not allow two players to directly interact except through the central dealer unit. Sitrick U.S. Pat. No. 4,572,509 illustrates an approach in which two or more players remote from each other may engage in interactive game play with the disclosed game apparatus, but the Sitrick approach continues to utilize a central game controller unit. Under the approach illustrated by Sitrick, there is no provision for two players to directly interact in electronic game play except by routing communications between the game units through a central controller system.

Therefore, there remains a gap in the art related to electronic game apparatus which is demonstrated by the lack of such game apparatus which can be directly linked for interactive play between two or more individuals at remote locations without the need for routing signals through a central control point. Further, there is no known provision in the art for remote, individual recording of game scores or point totals achieved by players engaged in interactive electronic game play.

SUMMARY OF THE INVENTION

The present invention provides hand held electronic game apparatus useable by a single player, but also useable for direct competitive play between two or more players through both physical linkage of multiple units of the apparatus and indirect linkage by radio or similar means. The apparatus of the invention includes a basic electronic game module, internal data storage means for storing game scores or point totals, data storage media as a source of game programming and of electronic storage of game scores or points, communication cable for direct linkage, and signal transmitter/receiver means for indirect linkage.

In a first, or basic, embodiment, each discrete game module of the apparatus includes a monitor or viewing screen, an input unit such as a keyboard, an electronic processing unit, one or more memory or data storage units, and a communications unit. In addition, each module of the apparatus provides a memory unit for accumulating or storing game score information for later transfer to a separate storage unit. The communications unit provides the capability for communication between two modules of the apparatus in "real time", allowing two or more players to interact in playing the same game in a competitive manner, with all game information and activity simultaneously displayed on the monitor of each module of the apparatus. It is preferred that the apparatus be designed to operate on, e.g., 12 VDC, so that it may be powered by batteries, an automobile electrical system, or standard house electrical service, with appropriate transformer(s).

In the basic embodiment, transmission of electronic signals between two modules of the apparatus used by players engaged in a competitive game is achieved through a cable interconnected between the two units. The communications unit is designed for automatic data exchange between the two modules, without player action, so that the monitor displays presented to the players by the linked units are identical. Data storage required during play to store, e.g., game status is accomplished automatically through use of the conventional memory unit. When a game is completed, the identity of the winner and the score achieved by the winning player are automatically stored in the additional memory unit in a manner which prevents a user from altering the stored data other than by initiating and completing another play of the relevant game program.

The apparatus of the invention further provides for transfer of accumulated score information from the internal memory unit to an external unit of electronic data storage, such as a data cartridge or a strip of magnetic storage media provided on a data card. It is contemplated that the data cards can be redeemed for prizes or merchandise credit once a pre-selected score or point total has been reached. It is further contemplated that data cards may be electronically coded at time of purchase with the identity of each player/purchaser, or may be coded by the unit of apparatus with which the data card is used.

In a first alternative embodiment, each game module of the apparatus further includes a transmitter/receiver unit for transmission and reception of radio and other types of communication signals, and the apparatus further includes an antenna unit, for the purpose of linking game modules for competitive play without the necessity of the direct cable linkage. The transmitter/receiver is capable of sufficient range to allow, e.g., linkage of units used in moving vehicles for a sufficient period of time to complete at least one game before signal loss. The inclusion of the transmitter/receiver also allows indirect linkage of units used in stationary locations, such as from house to house within a city or town. In the preferred embodiment the transmitter/receiver is adapted for the transmission and reception of radio signals, though it will be understood that other bands, such as microwave, and other forms of long distance communication, such as telephone or cellular telephone, may be used within the scope of the invention.

In a second alternative embodiment, the transmitter/receiver is designed and powered to be capable of transmission and reception of signals over a longer range. Such units would transmit to and receive from, e.g., base stations with, e.g., satellite linkage between base stations, providing effectively unlimited module to module linkage range.

The method of use associated with the apparatus of the invention generally comprises the following major steps: linking two or more game modules directly or indirectly; mutually selecting and loading a game program; executing the steps of the game program; temporarily storing game scores/points and player identification in a discrete memory unit within the game module, in such a way as to prevent alteration of the data; and transferring the temporarily stored game score and player data to a separate data storage unit or card so as to prevent alteration of the data during or after transfer.

The components and features of the apparatus of the invention may be described in greater detail with reference to the accompanying drawing figures.

DETAILED DESCRIPTION OF THE INVENTION

The following description of the invention is presented in terms of a basic embodiment, a first alternative embodiment, and a second alternative embodiment. However, it should be understood that all three embodiments specifically discussed are considered, in combination, to comprise the preferred embodiment, in that they are contemplated to be introduced as Phase I, Phase II, and Phase III of an electronic game system.

Figure 2:
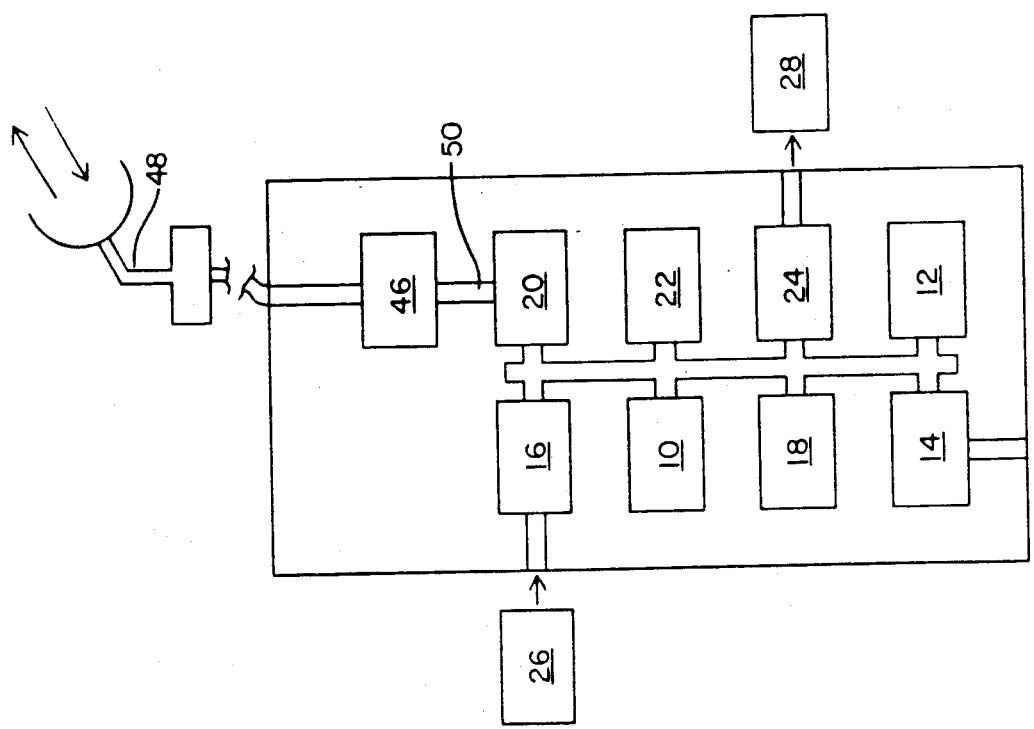
FIG. 2 is a schematic illustration of the units of a game module of the first alternative embodiment of the apparatus of the invention.
Figure 1:
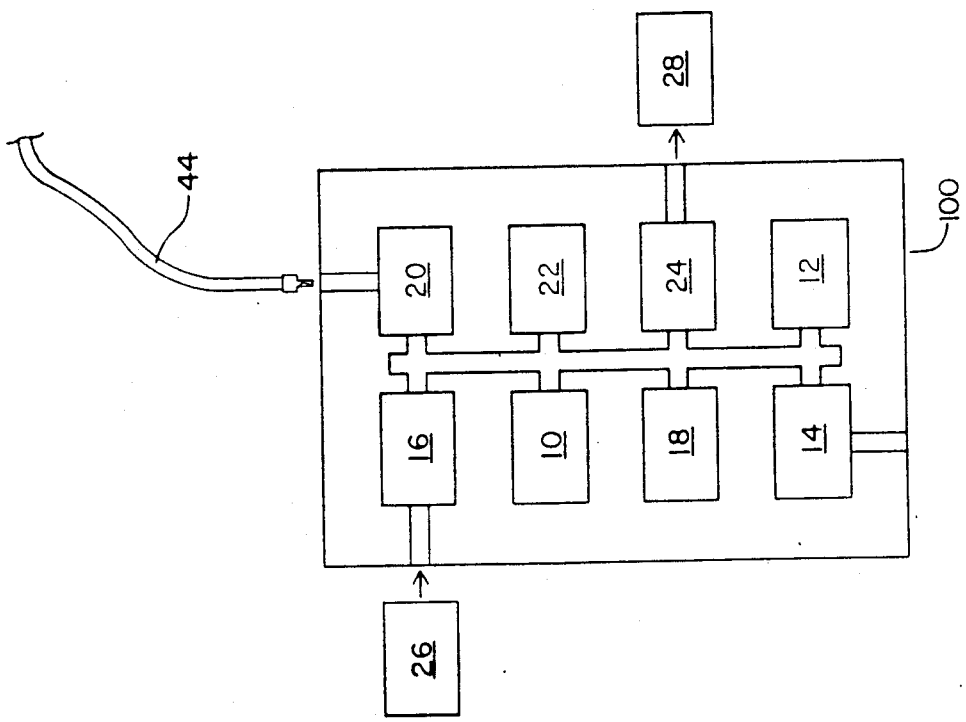
FIG. 1 is a schematic illustration of the units of a game module of the basic embodiment of the apparatus of the invention.
Figure 3:
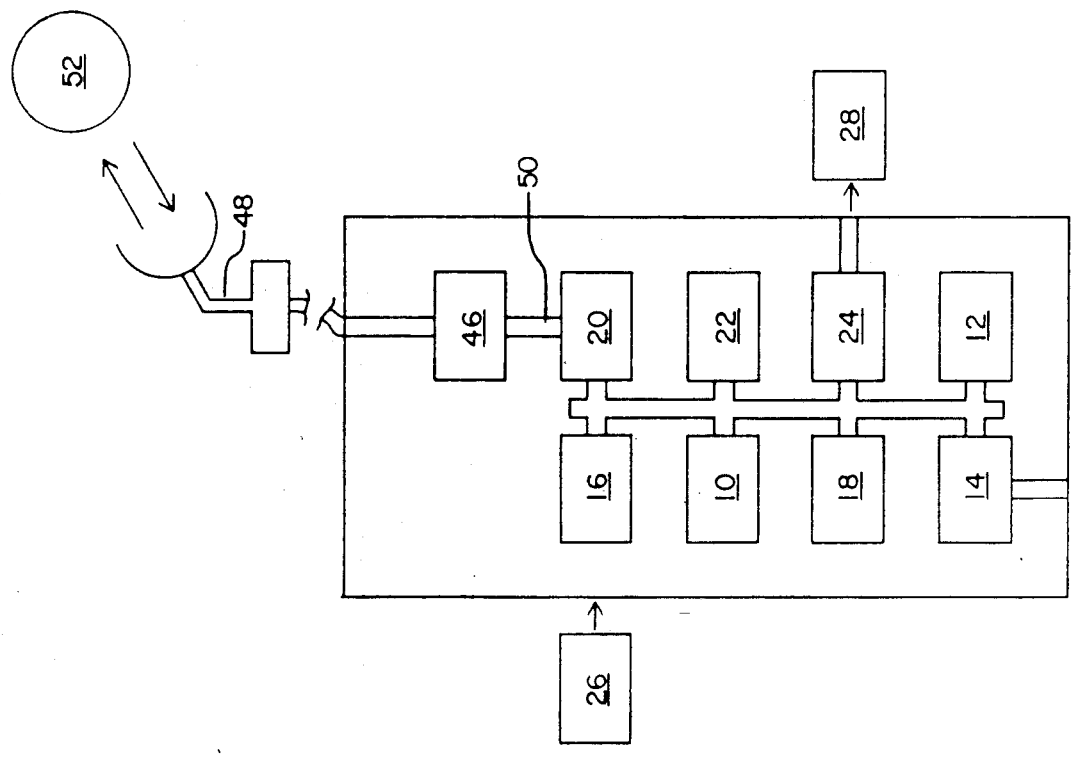
FIG. 3 is a schematic illustration of the units of a game module of the second alternative embodiment of the apparatus of the invention.

Referring now to FIGS. 1, 2, and 3, the basic embodiment of the apparatus of the invention comprises a Phase I module, generally designated by reference numeral 100, the first alternative embodiment includes a Phase II module designated by reference number 200, and the second alternative embodiment includes a Phase III module designated by reference number 300. Referring now to FIG. 1, Phase I module 100 includes as functional units a monitor or screen and monitor controller unit 10, a keyboard input unit 12, a power unit 14, computer processer unit 16, a memory unit 18, a communications unit 20, a game score storage unit 22, and a data card transfer unit 24. The apparatus of the invention also includes separate game program units 26, and game score cards 28.

Figure 4:
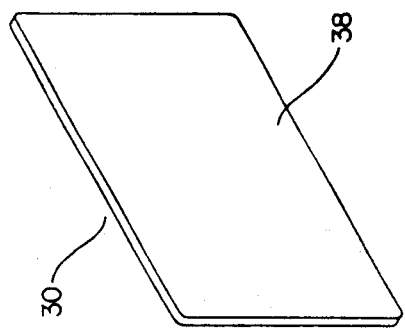
FIG. 4 is a perspective view of one face of a data card, including a magnetic media strip for storage of game data.
Figure 5:
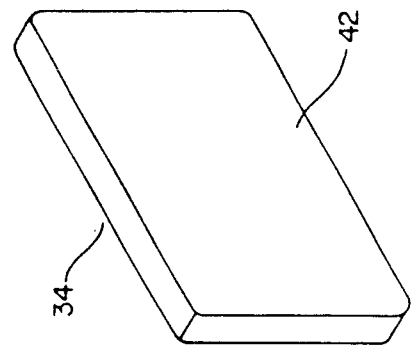
FIG. 5 is a perspective view of the opposite face of a data card as depicted in FIG. 4.
Figure 6:
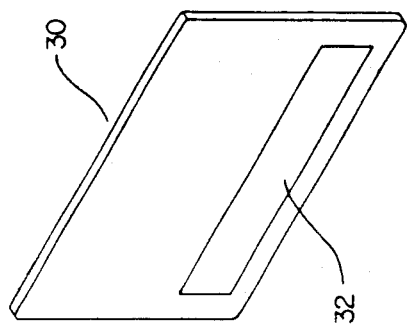
FIG. 6 is a partially cut away perspective view of one face of a data cartridge for storage of game data.
Figure 7:
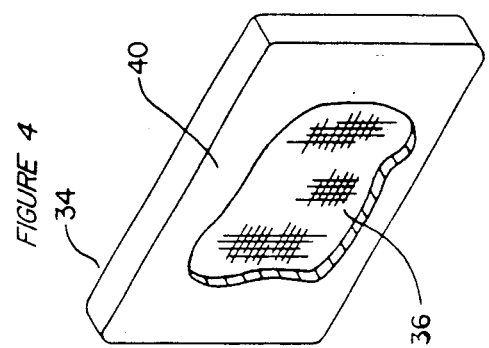
FIG. 7 is a perspective view of the opposite face of a data cartridge as depicted in FIG. 6.

More specifically, monitor and monitor controller unit 10 comprises a conventional monitor display screen capable of displaying both text and graphic images, and a conventional electronic monitor controller to control the image display on the monitor in response to input from other components of the apparatus. Keyboard input unit 12 comprises a conventional-type input device through which the user of the module supplies game play information to the module. Keyboard unit 12 may include standard text keys, directional movement keys, a joystick, or the like as appropriate for the various game programs which may be provided for use with the apparatus of the invention. Power unit 14 is an internal power supply for operation of the components of the module, and will typically include circuitry for receiving power from internal batteries or from an outside source. It is preferred that the components of the apparatus be designed to operate on 12 VDC power, to facilitate drawing power for operation directly from the electrical system of an automobile, but it will be understood that internal batteries or transformers to convert household electrical power to the required direct current voltage may also be used as raw power sources. Computer processor unit 16 comprises conventional computer circuitry and devices for processing data input to the processor unit in accordance with the processing instructions provided by the game program being utilized and for outputting signals to other units of the module. Memory unit 18 comprises conventional volatile electronic memory or data storage, for the purpose of temporarily storing data to be accessed by other components of the apparatus during the progress of a game. Communications unit 20 comprises electronic circuitry and devices adapted for the purpose of exchanging data between modules of the apparatus during interactive game play. Game score storage unit 22 comprises an independent memory or data storage unit distinct from memory unit 18, adapted for the limited purpose of receiving and storing the final score or results of one or more games. It is preferred that game score storage unit 22 be capable of permanent memory storage, as compared to the volatile storage capability of memory unit 18, so that game score data may be accumulated within unit 22 and will not be lost upon interruption of power to the unit, but volatile electronic storage systems may be utilized within the scope of the invention. Data card transfer unit 24 comprises a device for reading game score data from game score data unit 22, and writing or transferring such data to a game score card 28 in permanent form. Game program units 26 comprise conventional cartridges, disks, or other convenient digital data storage devices, containing computer program information for input to computer processor unit 16 for the purpose of programming the processor unit 16 with instructions for each game which may be played through use of the apparatus. Similarly, game score cards 28 comprise devices adapted for storage of digital data written to them by a data card transfer unit 24. Game score cards 28 may be provided in the form of cards 30 with a strip of magnetic media 32 on one face, as illustrated in FIGS. 4 and 5, or in the form of cartridges 34 containing electronic circuitry 36, as illustrated in FIGS. 6 and 7, as non-limiting examples. It is preferred that at least one face 38 of cards 30 and at least one of opposed faces 40 and 42 of cartridges 34 be provided with decorative surface ornamentation, such as depictions of automobiles as but one example, to enhance attractiveness and collectibility.

In the basic Phase I embodiment of the invention, modules 100 are linked for interactive play between two players by means of a communications cable 44, linking communications unit 20 of one module directly to communications unit 20 of the second module. Communications cable 44 will typically comprise a conventional electronic data transmission cable terminating at each end in identical plug devices, each adapted to be plugged into a socket device included within the structure of each module 100 and directly connected to communications unit 20. As game play progresses, data representing player actions and game status changes is continually transmitted between the two linked modules through communications units 20 and cable 44.

Two modules 100 of the apparatus are used for interactive electronic game play by plugging cable 44 into each module to form a data link between them, inserting a game program unit 26 into one of the modules 100, initiating instructions through keyboard input unit 12 to load the game program stored in program unit 26 into memory unit 18 and processor unit 16, whereupon the game program is immediately communicated to memory unit 18 and processor unit 16 of the second module 100 through communication units 20 of the linked modules. As the game program is loaded into the first module 100 and communicated to the second module, the beginning game images are displayed on monitor 10 of each module essentially simultaneously in terms of the ability of the human eye and brain to perceive and respond to such images. One of the players initiates play by inputting instructions to processor 16 through the keyboard input unit 12 of the respective module 100. All input to and output from processor 16 of either module 100 is automatically communicated to processor 16 of the other module 100 through their communications units 20 and linking cable 44, and each processor unit 16 is internally programmed to immediately update game status information to its associated memory unit 18 and display currently updated information on its associated monitor 10, so that each module 100 contains and displays identical information at any given time. As game play progresses toward a conclusion of the particular game being interactively played, the immediate exchange of input and output data between the linked modules continues, such that upon conclusion of the game each memory unit 18 of the modules 100 contains identical status information.

Upon conclusion of the game in accordance with the game program, each processor unit 16 is instructed by the program to transfer relevant information, such as winner/loser, game scores, or the like, to its associated game score storage unit 22 for, preferably, permanent storage within module 100, although volatile memory structures may be used. The program instructions for transfer of final information to the storage units 22 should be written so as to accomplish such transfer only upon full completion of a game, so that only score data from completed games is stored in and accessible from game score storage units 22.

If game score storage units 22 are provided as volatile memory units, game score or point total data which the user desires to store permanently should be transferred to a game score card 28 before the power to module 100 is interrupted. Transfer is accomplished by inserting a game score card 28 into module 100 and issuing appropriate instructions to processor 16 through keyboard input unit 12 to activate operation of the internalized data transfer program and accomplish the transfer of data to game score card 28 through data card transfer unit 24. The same process is utilized to transfer game score or point total data to a game score card 28 when game score storage units 22 are provided as non-volatile memory units, except that it is not necessary to accomplish the data transfer before interruption of power to module 100, since data stored in a non-volatile memory unit is not lost upon interruption of power.

The Phase II module 200, also referred to as the first alternative embodiment of the invention, illustrated in FIG. 2, includes all of the component units of module 100 as described above. Phase 11 module 200 additionally includes transmitter/receiver unit 46, preferably disposed within module 200, though transmitter/receiver unit 46 may be disposed external to module 200 and interconnected thereto by conventional wiring. It is preferred that transmitter/receiver 46 be a combined radio transmitter/receiver of conventional design and construction capable of transmitting and receiving radio signals over a reasonable distance, such as a citizens band radio transmitter receiver. However, any convenient form of communication, such as microwave, telephone, cellular telephone, or the like may be used if desired. The Phase II embodiment of the invention further includes antenna 48 interconnected to transmitter/receiver 46 to send and receive signals. Antenna 48 may be interconnected to and extend outward from module 200, but is preferably provided as a separate unit releaseably interconnected to module 200 by conventional wiring. Receiver/transmitter 46 is connected to communications unit 20 of module 200, so that communications between two modules 200 is routed through receiver/transmitter 46 and antenna 48 of each module 200 rather than through the physical linkage formed between communications units 20 of two modules 100 by cable 44. Modules 200 may be expected to require more power for operation than modules 100, in order to power transmitter/receiver 46, and power unit 14 may be modified if necessary to accomodate the increased power demands.

Since Phase II module 200 represents an "upgrade" of Phase I module 100, by the addition of receiver/transmitter 46 and antenna 48, receiver/transmitter 46 may be adapted to be interconnected to a module 100 by plugging an interconnecting cable, designated by reference numeral 50 in FIG. 2, into the external cable socket of the module 100. When so adapted, transmitter/receiver 46 and antenna 48 may be provided in a upgrade kit for use with Phase I modules 100, allowing a Phase I module 100 to be directly linked to another module 100 by cable 44 or indirectly linked to a module 200 through transmitter/receiver 46 and antenna 48. Phase II modules 200 with internal transmitter/receiver units 46 may be provided with a direct output connection to communications unit 20, so that two modules 200 may be directly linked by a cable 44 as described above in relation to modules 100.

In a variation of the second alternative, or Phase II, embodiment, antenna 48 may be omitted and transmitter/receiver 46 may be provided as a modem device for transmission and reception of data by modulation and demodulation of audio tones to be transmitted between two modules 200 by telephone connection. With this variation, two modules 200 could be telephonically linked and games played interactively from two non-mobile locations over a substantial distance.

Two modules 200 are used for interactive game play in the same basic manner as described in relation to modules 100, except that the linkage between the communications units 20 of the two modules is made indirectly by means of radio or other communication signals transmitted and received through transmitter/receiver units 46 and antennas 48 rather than directly through cable 44. It will be readily understood that the indirect linkage between modules 200 may be established and maintained over a significantly greater distance than is possible through the direct linkage described for modules 100, allowing interactive game play between two individuals in, e.g., different homes or different automobiles. Storage of game score data in a score card 28 is accomplished in exactly the same manner as described with reference to modules 100.

The second alternative embodiment, or Phase III, of the invention, schematically illustrated in FIG. 3, comprises module 300. Each module 300 include all components of module 200 and, like module 200, is designed to be indirectly linked to another module 300 by means of radio or other communication signals. The primary distinction between module 300 and module 200 is in the capability of the transmitter/receiver unit 46, which in module 300 is intended to transmit signals through, e.g., a communications satellite 52 to another module 300 over a potentially great distance. Each module 300 may also be adapted to transmit signals to and receive signals from a base station where incoming signals are amplified and transmitted to another base station by satellite linkage and from the second base station to a second module 300.

Modules 300 are used for interactive game play in the same manner as modules 200, and final game results are recorded as described above in relation to modules 100.

The foregoing description of the apparatus and method of the invention has been illustrative and not for purposes of limitation. It will be understood that the apparatus and method are susceptible to various alternative embodiments and modifications other than those described without departing from the scope and spirit of the invention as claimed.

What is claimed is:

1. An electronic game apparatus for the purpose of playing one or more preprogrammed electronic games, comprising
    a game display and control module having
        a monitor display screen for the purpose of displaying text and graphic images;
        a monitor controller unit for the purpose of controlling the image display on said monitor display screen;
        a keyboard input unit having a plurality of keys for the purpose of input of data and commands to the apparatus by a user thereof;
        a power supply unit for the purpose of supplying electrical power to the components of the apparatus;
        a computer processor unit for the purpose of receiving, processing, and outputting data and control signals during operation of the apparatus;
        a first memory unit for the purpose of temporarily storing data to be accessed by other units of the apparatus during operation of the apparatus;
        a second memory unit for the purpose of storing data representing final game scores or player point totals at the conclusion of an electronic game;
        a communications unit for the purpose of transmitting communications signals to and receiving communications signals from a separate electronic game apparatus so as to allow interactive play of an electronic game between two or more players; and
    a communications linkage for the purpose of transmitting communications signals between communications units of two or more discrete game display and control modules of the apparatus.

2. The electronic game apparatus of claim 1, wherein said communications linkage comprises an electrically conductive cable to be interconnected between said communications units of two game display and control modules of the apparatus.

3. The electronic game apparatus of claim 1, further comprising one or more game program units each containing one or more sets of digitally coded electronic game program instructions for the purpose of controlling the electronic processing and handling of data by said game display and control module, and wherein said game display and control module further includes a game program reader unit for the purpose of reading electronic game program instructions from said game program units and transmitting said electronic game program instructions to said processor unit of said game display and control module.

4. The electronic game apparatus of claim 1, further comprising one or more game score recording units to receive and store digitally coded electronic data representing final game scores or player point totals accumulated by said second memory unit of said game display and control module, and wherein said game display and control module further includes a game score transfer unit for the purpose of transferring final game score or player point total data from said second memory unit to one of said game score recording units.

5. The electronic game apparatus of claim 1, wherein said communications linkage comprises a radio transmitter and receiver unit for the purpose of transmitting and receiving radio signals between two or more game display and control modules of the apparatus.

6. The electronic game apparatus of claim 5, wherein said communications linkage further comprises a radio signal receiving and transmitting antenna and an antenna cable interconnected between said antenna and said radio transmitter and receiver unit.

7. The electronic game apparatus of claim 1, wherein said communications linkage comprises a modulator-demodulator unit to receive data in digital form from said communications unit of said game display and control module, convert said data in digital form to a form suitable for telephonic transmission, and transmit the converted data to a telephone system for transmission to a modulator-demodulator unit of another apparatus of the invention for conversion to digital form and transmission to the communications unit of the game display and control unit of the other apparatus of the invention.

8. The electronic game apparatus of claim 4 wherein each of said game score recording units comprises a generally rectangular thin plate with a first face and a second face, having a strip of magnetic electronic data storage media permanently interconnected to the first face thereof.

9. The electronic game apparatus of claim 4 wherein each of said game score recording units comprises an electronic data storage cartridge having an electronic circuit board and one or more electronic data storage chips interconnected to said circuit board, and having an enclosure to surround and protect said electronic circuit board and said one or more electronic data storage chips.

10. The electronic game apparatus of claim 4 wherein each of said game score recording units comprises an electronic data storage disk of base material having a first face and a second face, with electronic data storage media interconnected to at least the first face thereof, and wherein said game score transfer unit comprises a disk drive unit to physically receive and electronically transfer data to said electronic data storage disk.

11. A method of interactive electronic game play between two players each using an electronic game apparatus having a monitor display screen and monitor controller unit, a keyboard input unit, a power unit, a computer processor unit, a first memory unit, a second memory unit for storing game score or point total data, a communications unit, a game score transfer unit, a communications linkage for transmitting and receiving electronic data between two of the electronic game apparatus, a game program unit containing game program instructions, and a game score recording unit, comprising the steps of placing a first one of the electronic game apparatus in communication with a second one of the electronic game apparatus through the communications linkage between the communications units of the first and second game apparatus;

connecting a game program unit to the first electronic game apparatus so as to form an electronic pathway for communicating game program instructions to the computer processor unit of such first game apparatus;

initiating instructions through the keyboard input unit of such first game apparatus to load the game program into the first memory unit and the computer processor unit of the first game apparatus;

communicating said game program to the first memory unit and the computer processor unit of the second game apparatus through the communications units of the first and second game apparatus and through the communications linkage therebetween;

initiating game play by inputting instructions through the keyboard input unit of the first game apparatus to the computer processor unit of the first game apparatus;

immediately communicating such instructions from the first game apparatus to the second game apparatus through the communications units of the first and second game apparatus and through the communications linkage therebetween;

continuing game play by inputting instructions through the keyboard input units of the first and second game apparatus and immediately communicating such instructions and the output of the computer processor units of the first and second game apparatus to the first memory units of both first and second game apparatus, to the computer processor units of both first and second game apparatus, and to the monitor display units of both first and second game apparatus, such that both units substantially simultaneously execute game program instructions through their respective computer processor units, contain the same data in their respective first memory units, and display the same images on their respective monitor display units;

continuing game play to the conclusion of the game by completing the steps of the game program;

transferring game play results in the form of electronic data to the second memory units of the first and second game apparatus; and transferring game play results in the form of electronic data from the second memory unit of either or both first and second game apparatus to a game score recording unit connected to the respective first and/or second game apparatus to permanently record such game play results.

12. The method of claim 11, wherein the communications linkage for transmitting and receiving electronic data comprises an electrically conducting cable, and wherein the step of placing a first one of the electronic game apparatus in communication with a second one of the electronic game apparatus through the communications linkage between the communications units of the first and second game apparatus is performed by removeably physically interconnecting said cable between the communications units of the first and second game apparatus.

13. The method of claim 11, wherein the communications linkage for transmitting and receiving electronic data comprises a radio transmitter and receiver and wherein the step of placing a first one of the electronic game apparatus in communication with a second one of the electronic game apparatus through the communications linkage between the communications units of the first and second game apparatus comprises establishing a radio communications link between the radio transmitters and receivers of the first and second game apparatus.

14. The method of claim 13, wherein the communications linkage for transmitting and receiving electronic data further comprises a transmitting and receiving antenna operatively connected to said radio transmitter and receiver.

15. The method of claim 11, wherein the communications linkage for transmitting and receiving electronic data comprises a transmitter and receiver unit for transmission and reception of electromagnetic communication signals and wherein the step of placing a first one of the electronic game apparatus in communication with a second one of the electronic game apparatus through the communications linkage between the communications units of the first and second game apparatus comprises establishing a communications link between the transmitters and receivers of the first and second game apparatus.

16. The method of claim 11, comprising the further step of preventing alteration of the game play results transferred in the form of electronic data to the second memory units of the first and second game apparatus without initiating and completing play of a game program with the electronic game apparatus.

17. The method of claim 11, wherein the step of transferring game play results in the form of electronic data from the second memory unit of either or both first and second game apparatus to a game score recording unit connected to the respective first and/or second game apparatus to permanently record such game play results comprises transferring such electronic data to a strip of magnetic data storage media disposed on one face of a discrete plate.

18. The method of claim 11, wherein the step of transferring game play results in the form of electronic data from the second memory unit of either or both first and second game apparatus to a game score recording unit connected to the respective first and/or second game apparatus to permanently record such game play results comprises transferring such electronic data to magnetic data storage media interconnected to at least one face of a discrete disk of base material.

19. The method of claim 11, wherein the step of transferring game play results in the form of electronic data from the second memory unit of either or both first and second game apparatus to a game score recording unit Connected to the respective first and/or second game apparatus to permanently record such game play results comprises transferring such electronic data to electronic circuitry disposed within a discrete enclosure.

* * * * *